(12) United States Patent
Bruns

(10) Patent No.: US 11,760,282 B2
(45) Date of Patent: Sep. 19, 2023

(54) METHOD FOR DETECTING A SPECIAL OPERATING STATE OF A MOTOR VEHICLE, MOBILE APPARATUS, COMPUTER PROGRAM PRODUCT AND REFERENCE NOISE COLLECTION

(71) Applicant: Continental Automotive GmbH, Hannover (DE)

(72) Inventor: Carsten Bruns, Regensburg (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 457 days.

(21) Appl. No.: 15/928,317

(22) Filed: Mar. 22, 2018

(65) Prior Publication Data

US 2018/0272966 A1    Sep. 27, 2018

(30) Foreign Application Priority Data

Mar. 23, 2017   (DE) .................. 10 2017 204 941

(51) Int. Cl.
*B60R 16/02*    (2006.01)
*B60R 16/023*    (2006.01)
(Continued)

(52) U.S. Cl.
CPC ...... *B60R 16/0234* (2013.01); *B60R 16/0237* (2013.01); *G01M 17/007* (2013.01);
(Continued)

(58) Field of Classification Search
CPC .......... B60R 16/0234; B60R 16/0237; G01M 17/007; G01M 7/00; G06Q 30/0808;
(Continued)

(56) References Cited

U.S. PATENT DOCUMENTS 4,676,111 A * 6/1987 Wagner ............... G01M 17/007
                                                       73/116.05
7,103,460 B1    9/2006 Breed
(Continued)

FOREIGN PATENT DOCUMENTS

CN    101029855 A    9/2007
CN    102486646 A    6/2012
(Continued)

OTHER PUBLICATIONS

Office Action dated Nov. 10, 2017 from corresponding German Patent Application No. 10 2017 204 941.3.

*Primary Examiner* — Michael V Kerrigan

(57) ABSTRACT

A method for detecting a special operating state of a motor vehicle which differs from a normal operating state of the motor vehicle, in which a noise emitted by the motor vehicle during operation of the motor vehicle is captured in the interior of the motor vehicle using a mobile apparatus which is separate from the motor vehicle, and the noise is compared with a plurality of reference noises provided by the mobile apparatus, the noise being assigned to a most similar reference noise of the plurality of reference noises on the basis of the comparison if a minimum similarity value is exceeded, and the special operating state being detected by the assignment which has been carried out.

8 Claims, 2 Drawing Sheets

(51) Int. Cl.
  *G01M 17/007* (2006.01)
  *G06Q 30/0601* (2023.01)
  *G07C 5/08* (2006.01)
  *H04W 4/02* (2018.01)

(52) U.S. Cl.
  CPC ....... *G06Q 30/0631* (2013.01); *G07C 5/0808* (2013.01); *H04W 4/02* (2013.01); *H04W 4/026* (2013.01)

(58) Field of Classification Search
  CPC . G06Q 30/0631; G07C 5/0808; H04W 4/026; H04W 4/02
  See application file for complete search history.

(56) References Cited

U.S. PATENT DOCUMENTS

| | | | |
|---|---|---|---|
| 7,493,238 B2 | 2/2009 | Tanaka et al. | |
| 7,672,756 B2 | 3/2010 | Breed | |
| 8,775,013 B1 | 7/2014 | Smailus | |
| 9,200,579 B2 | 12/2015 | Troebst | |
| 10,360,740 B2* | 7/2019 | Kapoor | G07C 5/0808 |
| 2005/0177352 A1 | 8/2005 | Gravel | |
| 2012/0143431 A1 | 6/2012 | Kim et al. | |
| 2013/0261879 A1 | 10/2013 | Chen et al. | |
| 2014/0100714 A1 | 4/2014 | Linn et al. | |
| 2014/0379205 A1 | 12/2014 | Muetzel et al. | |
| 2015/0057976 A1 | 2/2015 | Yang et al. | |
| 2015/0187146 A1 | 7/2015 | Chen et al. | |
| 2018/0350167 A1* | 12/2018 | Ekkizogloy | G07C 5/0808 |

FOREIGN PATENT DOCUMENTS

| | | |
|---|---|---|
| CN | 103306823 A | 9/2013 |
| CN | 103364202 A | 10/2013 |
| CN | 103712799 A | 4/2014 |
| CN | 106327344 A | 1/2017 |
| CN | 106441302 A | 2/2017 |
| DE | 19844784 A1 | 4/2000 |
| DE | 20216738 U1 | 1/2003 |
| DE | 102004034749 A1 | 2/2006 |
| DE | 102007051261 A1 | 4/2009 |
| DE | 102008047473 A1 | 4/2010 |
| DE | 102015207486 A1 | 10/2016 |
| EP | 1813929 A2 | 8/2007 |
| WO | 02/097738 A1 | 12/2002 |

* cited by examiner

METHOD FOR DETECTING A SPECIAL OPERATING STATE OF A MOTOR VEHICLE, MOBILE APPARATUS, COMPUTER PROGRAM PRODUCT AND REFERENCE NOISE COLLECTION

CROSS-REFERENCE TO RELATED APPLICATIONS

This application claims the benefit of German Patent Application 10 2017 204 941.3, filed Mar. 23, 2017. The disclosure of the above application is incorporated herein by reference.

FIELD OF THE INVENTION

The invention relates to a method for detecting a special operating state of a motor vehicle which differs from a normal operating state of the motor vehicle. The invention also relates to a mobile apparatus for detecting a special operating state of a motor vehicle which differs from a normal operating state of the motor vehicle. The invention also relates to a computer program product having instructions which may be executed by a computer system and are intended to carry out a corresponding method, and to a reference noise collection.

BACKGROUND OF THE INVENTION

In this context, it is known that acoustic or vibration-based monitoring is used during quality control at the end of an assembly line for vehicle production, and when monitoring engine test benches, in order to detect faults in good time.

In the present case, there is now interest in detecting a special operating state of a motor vehicle. In this case, the special operating state differs from a normal operating state of the motor vehicle and may be present, for example, as a result of a defective component of the motor vehicle.

SUMMARY OF THE INVENTION

An object is to provide a method, a mobile apparatus, a computer program product and a reference noise collection, in the case of which or with which a special operating state of a motor vehicle is detected more accurately.

This object is achieved by means of a method, a mobile apparatus, a computer program product and a reference noise collection according to the independent claims.

In a method according to the invention, a special operating state of a motor vehicle which differs from a normal operating state of the motor vehicle is detected. A noise emitted by the motor vehicle during operation of the motor vehicle is captured in the interior of the motor vehicle using a mobile apparatus which is separate from the motor vehicle. The noise is compared with a plurality of reference noises provided by the mobile apparatus. Furthermore, the noise is assigned to a most similar reference noise of the plurality of reference noises on the basis of the comparison if a minimum similarity value is exceeded. The special operating state is detected by the assignment which has been carried out.

The procedure is based on the knowledge that a special operating state of the motor vehicle, for example a journey of the motor vehicle with a defective wheel bearing, is distinguished by an unmistakable and uniquely assignable noise, as a result of which the special operating state is detected again after being assigned to this noise once.

The normal operating state is, in particular, a state of the motor vehicle in which all components of the motor vehicle, in particular components which generate noise, are operating correctly. Therefore, there is no defective component in the normal operating state, in particular. In contrast, in the special operating state, there is a defective component of the motor vehicle, in particular a component which generates noise. It may also be the case, for example, that the component generates the noise only when it is defective and is operated silently in the non-defective state. However, it may also be the case that the noise of the component changes from correct operation to defective or damaged operation. The change may take place, for example, as a result of the spectrum of the frequency and/or the volume of the noise changing.

The noise is captured in the interior of the motor vehicle. The noise is an airborne sound signal and is not a structure-borne sound signal, in particular. The interior of the motor vehicle is, in particular, a passenger compartment of the motor vehicle, that is to say the region of the interior in which a vehicle occupant is located.

The noise is captured using the mobile apparatus. The mobile apparatus is preferably a mobile telephone, a smartphone, a tablet or a portable computer. The mobile apparatus is designed to be separate from the motor vehicle, that is to say the mobile apparatus may be readily removed from the interior of the motor vehicle and may be moved to another location. Furthermore, provision is made, in particular, for the mobile apparatus to be able to be moved freely inside the interior and to be able to be passed from one vehicle occupant to another, for example. In particular, however, the mobile apparatus may also be fixed to a holder provided for this purpose in the interior of the motor vehicle. The mobile apparatus has, in particular, a microphone in order to capture the noise.

The captured noise is compared with the plurality of reference noises. In this case, the reference noises are noises which are recorded, in particular in advance, and to each of which at least one special operating state is assigned. The reference noises are provided by the mobile apparatus; this means, in particular, that the mobile apparatus has access to a database or a reference noise collection in which the plurality of reference noises are held. The reference noise collection may then be stored, for example, in the mobile apparatus or is stored on a server which is coupled, in particular wirelessly, to the mobile apparatus and may be formed outside or inside the motor vehicle. In the last-mentioned case, the mobile device transmits the noise to the server. The latter may carry out the comparison.

If the minimum similarity value is exceeded, it is assumed that there is a special operating state and not a normal operating state. If the minimum similarity value is not exceeded, it is assumed, in particular, that the motor vehicle is being operated in the normal operating state and there is no defective component, in particular. The minimum similarity value is not exceeded, in particular, when the noise is not assigned to one of the reference noises with a sufficiently high degree of similarity.

Provision is preferably made for a defective component of the motor vehicle to be determined by means of a predefined assignment between the defective component and the plurality of reference noises. The assignment is therefore generally present between the component and the reference noise. If the special operating state is detected, that is to say if it is detected that the motor vehicle is not being operated in the normal operating state, that is to say there is a defect, a defective component or a plurality of defective components of the motor vehicle is/are determined on the basis of the assignment. Determining the defective component makes it possible to determine, for example, an identification, in particular a parts number for a replacement part of the motor vehicle. In this case, the defective component may be, for example, a group of components comprising a wheel bearing, a radiator fan or the main drive unit. However, the defective component may also already correspond to the specific replacement part. The defective component may therefore denote, for example, a sealing ring, a retaining clamp or a ball bearing. Determining the defective component then makes it possible to immediately estimate the replacement part costs and/or the total repair costs including the labor costs, for example. The costs may be assigned to the respective reference noise by means of the assignment. The ordering of a replacement part for the defective component may also already be prepared, for example, and suggested to a user of the mobile apparatus or is immediately ordered automatically after the defective component has been determined.

Furthermore, provision is preferably made for at least one state of the motor vehicle to be determined on the basis of a communication bus of the motor vehicle, and for the plurality of reference noises provided by the mobile apparatus to be selected on the basis of an assignment between the state and the plurality of reference noises. The state which is determined on the basis of the communication bus may be, for example, a speed value, an acceleration value, in particular a value of a lateral acceleration, an inclination angle, an operating period or a tire pressure value of the motor vehicle. The communication bus of the motor vehicle is, for example, a CAN bus (Controller Area Network), an Ethernet or a LIN bus (Local Interconnect Network). The communication bus is then connected to various sensors of the motor vehicle, for example. As a result of the state of the motor vehicle, the plurality of reference noises may be adapted more individually to the current situation while capturing noises and the noise is assigned to the reference noises in a more accurate manner.

Furthermore, provision is preferably made for the noise to be purged of a normal noise characterizing the normal operating state and for the purged noise to be compared with the plurality of reference noises. Purging the noise makes it possible to assign the noise to the plurality of reference noises in a more accurate and reliable manner. The normal noise is captured, for example, at a time at which the motor vehicle is evidentially in the normal operating state. The normal noise may be provided for various states of the motor vehicle, for example. The normal noise is provided, for example, by a manufacturer of the motor vehicle or by the workshop of the motor vehicle or by the user of the mobile apparatus himself by recording the normal noise during the normal operating state of the motor vehicle using the mobile apparatus.

Furthermore, provision is preferably made for a position of the mobile apparatus in the interior relative to the motor vehicle to be determined, and for a distance between the source of the noise and the position of the mobile apparatus to be determined, and/or for an orientation of the source of the noise relative to the mobile apparatus in the interior to be determined, and for a position of the source to be determined on the basis of the distance and/or the orientation, the noise being assigned to the plurality of reference noises on the basis of the position of the source with respect to the motor vehicle. As a result of the position of the mobile apparatus in the interior being determined, it is determined where the mobile apparatus is situated while recording the noise. In addition, a distance between the source of the noise and the position is preferably determined. The noise is assigned to the reference noises in a more reliable and precise manner on the basis of the position and distance. Reference noises which come into consideration for the noise may thus be selected on the basis of the position and distance. A radius with the distance may therefore be drawn around the position, for example, and only those components of the motor vehicle which are included in the radius and possibly a tolerance range of the radius are then also taken into account in the reference noises provided for the comparison. Additionally or alternatively, the orientation of the source of the noise relative to the mobile apparatus may also be determined. As a result of the orientation, it is then possible to take into account the information that the noise is emitted from a rear left-hand region of the motor vehicle, for example. In this case, the position of the source is, in particular, a position estimate or a position region, that is to say a region of the motor vehicle in which the source of the noise is arranged. When assigning the noise to the plurality of reference noises, only those reference noises which are associated with regions of the motor vehicle via a positional assignment at the position or in the position region of the source are preferably then taken into account. For example, the region of the wheel arrangements on the motor vehicle, that is to say front left, front right, rear left and rear right for example, may be allocated to the reference noise of a defective wheel bearing, whereas a reference noise is not allocated to a defective wheel bearing in the center of the vehicle. If the source of the noise is now determined in the center of the vehicle for example, the noise is also not compared with the reference noises of the faulty wheel bearing. Incorrect assignment to an incorrect reference noise is prevented thereby and the special operating state is detected in a more reliable manner thereby. A position in the motor vehicle is preferably assigned to each reference noise. In this case, the position may be present only in two dimensions in the road plane, for example, or may be present in a three-dimensional space.

Furthermore, provision is preferably made for a current acceleration value of the mobile apparatus to be captured while capturing the noise, and for the noise to be assigned to the plurality of reference noises on the basis of the current acceleration value. In this case, the current acceleration value is captured, in particular, using an acceleration sensor of the mobile apparatus. Capturing the acceleration value of the mobile apparatus may make it unnecessary to tap off the acceleration value via the communication bus of the motor vehicle. The acceleration of the mobile apparatus may also be taken into account, for example, even when there is no coupling, for example wireless, between the mobile apparatus and the motor vehicle. Additionally or alternatively, it is also possible to determine, for example, a relative acceleration value between the acceleration of the mobile apparatus and an acceleration of the motor vehicle. The acceleration value of the mobile apparatus may differ from the acceleration value of the motor vehicle in this case if the mobile apparatus is moved while capturing the noise in the interior. This may then be likewise taken into account when assigning the noise to the plurality of reference noises. In this case, different previously known acceleration values of the mobile apparatus are assigned to the reference noises. The assignment is created, in particular, in the reference noise collection or a database. The relative acceleration may also be of interest since a noise changes or has a higher or lower frequency when the microphone of the mobile apparatus is moved toward the source of the noise or away from the source of the noise. This effect is taken into account by the determined relative acceleration.

Furthermore, provision is preferably made for a current environmental situation of the motor vehicle to be captured while capturing the noise, and for the noise to be assigned to the plurality of reference noises on the basis of the current environmental situation. In this case, different previously known environmental situations are assigned to the reference noises. The assignment is created, in particular, in the reference noise collection or a database. In this case, the current environmental situation is captured by means of environmental sensors of the motor vehicle, for example. However, the current environmental situation may also be captured by a further motor vehicle in a region surrounding the motor vehicle and may then be transmitted, preferably wirelessly, to the motor vehicle, for example according to the car-to-X communication principle. As a result of the current environmental situation, the noise may be assigned to the plurality of reference noises in a more precise and reliable manner. For example, the current environmental situation may reveal that raindrops are falling on the motor vehicle or the motor vehicle is traveling on a wet road and a characteristic driving noise results therefrom, or that interfering noises are registered from the outside, for example if the vehicle is in slow-moving traffic or a traffic jam and a truck with loud engine noises is being operated beside the motor vehicle, for example. Particular reference noises of the plurality of reference noises may then be selected, in particular, for the assignment of the noise on the basis of the current environmental situation. However, the current environmental situation may also be used to determine the normal noise, for example.

Furthermore, provision is preferably made for a workshop proposal for the motor vehicle to be determined by means of an assignment between the workshop proposal and the plurality of reference noises, and for the workshop proposal to be output by the mobile apparatus, in particular. The workshop which has special expert knowledge for this type of damage may therefore be assigned to the most similar reference noise, for example. The workshop proposal may include, for example, a location of the workshop which is close to a current position of the motor vehicle, for example, and/or a name of the workshop. On the basis of the detected special operating state or the defective component, it is then possible to estimate, for example, how long the motor vehicle may still be operated for without worries in order to reach the workshop proposed by the workshop proposal. It is therefore possible to weigh up, for example, a nearby workshop and a more remote workshop which has, however, greater repair experience with regard to the defective component. The workshop proposal therefore contains repair experience and/or information relating to whether a replacement part is available for the defective component. Furthermore, the workshop proposal may take into account, for example, the vehicle type or vehicle factory to which the motor vehicle belongs. For example, the vehicle type may be input to the mobile apparatus, for example by means of a radio signal or an image recording made of the motor vehicle using the mobile apparatus. However, the vehicle type may also be transmitted via the communication bus of the motor vehicle, for example. The workshop proposal shows the user of the mobile apparatus a quick way of ending the special operating state again.

Furthermore, provision is preferably made for the noise, in particular together with operating information relating to the motor vehicle, to be recorded by the mobile apparatus and to be provided as a reference noise of the plurality of reference noises. As a result of the noise being recorded, the user of the mobile apparatus may expand the plurality of reference noises or a database in which the reference noises are stored. As a result, the user may assign noises which occur again to the reference noises in a more precise and reliable manner, for example. However, the mobile apparatus may also record the noise, for example, and may classify it as normal noise. For this situation, this noise is no longer assigned to the reference noises when the mobile apparatus is next used and a, possibly incorrect, special operating state is not detected. The recorded noise may then be classified, for example, by the user of the mobile apparatus or a workshop carrying out the repair, that is to say is assigned to a defective component of the motor vehicle, in particular. The noise is preferably recorded together with the operating information. In this case, the operating information may be, for example, an acceleration value, a speed value or an inclination angle of the motor vehicle.

The invention also relates to a mobile apparatus. The mobile apparatus is designed to detect a special operating state of a motor vehicle which differs from a normal operating state of the motor vehicle. A noise emitted by the motor vehicle is captured in the interior of the motor vehicle during operation of the motor vehicle by the mobile apparatus. In this case, the mobile apparatus is designed to be separate from the motor vehicle. Furthermore, the noise may be compared with a plurality of reference noises provided by the mobile apparatus. The noise is assigned to a most similar reference noise of the plurality of reference noises on the basis of the comparison if a minimum similarity value is exceeded, and the special operating state is detected by the assignment which has been carried out.

The invention also relates to a computer program product having instructions which is executed by a computer system and are intended to carry out a method according to the invention.

In this case, the computer program product is stored, in particular, on a computer-readable medium, for example a flash memory, a volatile memory or a magnetic memory.

In this case, the computer program product is preferably in the form of an application program. The application program is preferably designed to be executed on a mobile operating system, for example iOS or Android or Windows-Mobile.

Furthermore, the invention also relates to a reference noise collection having a plurality of reference noises. A special operating state and at least one defective component are respectively assigned to the reference noises of the plurality of reference noises.

In particular, the reference noise collection is in the form of a database. The reference noise collection may be held, for example, on a server which is formed outside the vehicle and separate from the mobile apparatus or, additionally or alternatively, may be stored in the mobile apparatus. The reference noise collection may also be held at a plurality of locations and may be synchronized at predetermined intervals, for example.

The reference noise collection comprises the assignment of reference noises to defective components of the motor vehicle. Vehicle manufacturers, vehicle types, positions of the mobile device, states of the motor vehicle, acceleration values, environmental situations and/or inclination angles of the motor vehicle are also assigned to the reference noises. The assignment may be in the form of a relational database, for example.

The assignment is carried out, in particular, on the basis of previously known training data.

Reference noises may be selected for the comparison by means of the information assigned to the reference noises. As a result, the comparison may then be carried out more quickly and more reliably since fewer reference noises have to be compared.

Provision is preferably made for a workshop proposal to be respectively assigned to the reference noises of the plurality of reference noises. A suitable workshop for repairing the defective component is proposed by means of the workshop proposal.

Advantageous embodiments of the method according to the invention may be considered to be advantageous embodiments of the mobile apparatus, of the computer program product and of the reference noise collection.

Further features of the invention emerge from the claims, the figures and the description of the figures. The features and combinations of features mentioned in the description above and the features and combinations of features mentioned in the description of the figures below and/or shown in the figures alone may be used not only in the respectively stated combination, but also in other combinations or alone without departing from the scope of the invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Exemplary embodiments of the invention will be explained in more detail below on the basis of schematic drawings. In the drawings.

DETAILED DESCRIPTION OF THE PREFERRED EMBODIMENT

The following description of the preferred embodiment(s) is merely exemplary in nature and is in no way intended to limit the invention, its application, or uses.

In the figures, identical or functionally identical elements are provided with identical reference signs.

Figure 1:
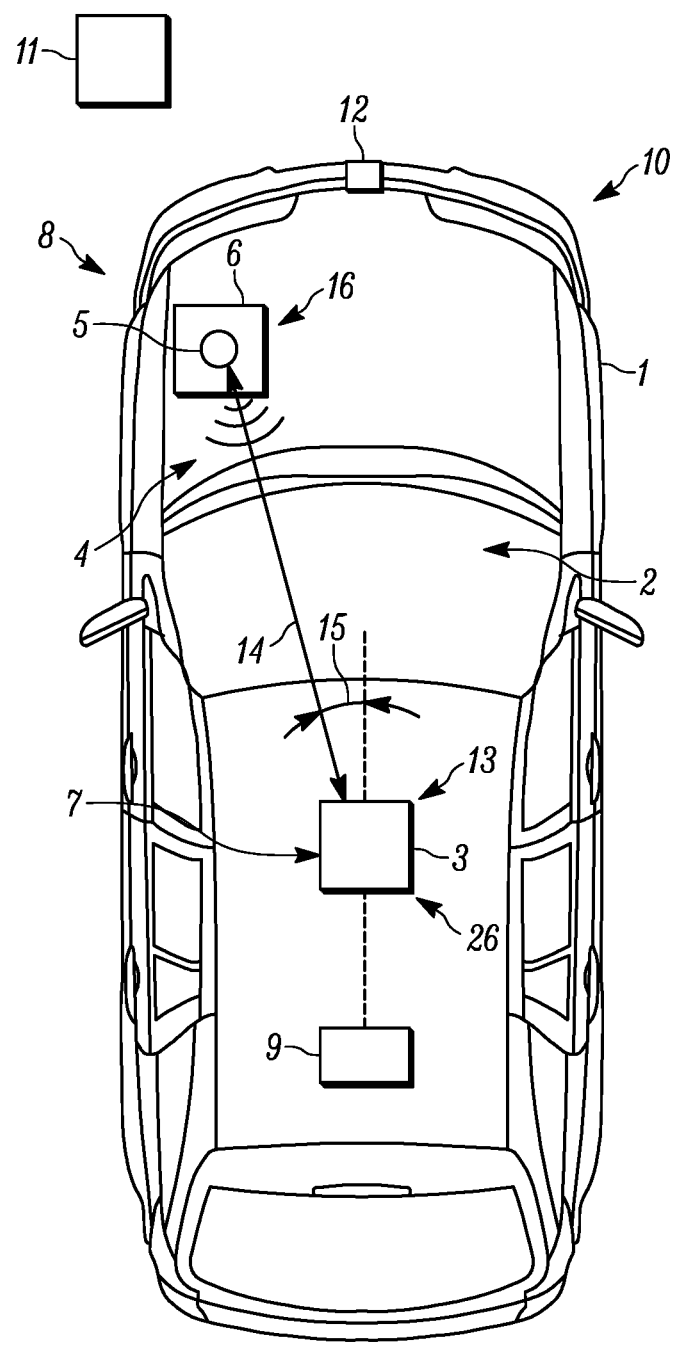
FIG. 1 shows a schematic plan-view illustration of a motor vehicle having an exemplary embodiment of a mobile apparatus in an interior of the motor vehicle.

FIG. 1 shows a schematic illustration of a motor vehicle 1 in plan view. A mobile apparatus 3 is in an interior 2 of the motor vehicle 1. The interior 2 of the motor vehicle 1 is, in particular, a passenger compartment or a space of the motor vehicle 1 in which a vehicle occupant is usually located.

The mobile apparatus 3 is designed to be separate from the motor vehicle 1 and is held, for example, by a user of the mobile apparatus 3 in his hands. However, the mobile apparatus 3 may also be stored at any desired location in the interior 2, for example on a center console of the motor vehicle 1. The mobile apparatus 3 may also be fastened to a holder in the motor vehicle 1, for example.

The mobile apparatus 3 may be wirelessly coupled, for example, to a data transmission interface of the motor vehicle 1, for example by means of a Bluetooth connection.

The mobile apparatus 3 is used to capture a noise 4 emitted by the motor vehicle 1 in the interior 2 of the motor vehicle 1. The noise 4 comes from a source 5. Sound which characterizes the noise 4 therefore spreads from the source 5. The source 5 is present in or on a defective component 6 of the motor vehicle 1, in particular.

According to the exemplary embodiment from FIG. 1, the noise 4 is emitted by a wheel bearing arranged at the front left of the motor vehicle 1 as the defective component 6. However, the defective component 6 may be in the form of a versatile component of the motor vehicle 1. The defective component 6 may be, for example, a windshield wiper, a tire, an exhaust system, in particular a central silencer or a rear silencer, a brake system, a holder or a paneling part.

The noise 4 is now compared with a plurality of reference noises 7. The plurality of reference noises 7 is provided, in particular, by the mobile apparatus 3. This means that the mobile apparatus 3 itself holds the plurality of reference noises 7 and they are therefore stored in the mobile apparatus 3 or that the plurality of reference noises 7 are held on a server outside the apparatus and are retrieved by the mobile apparatus 3 if necessary, for example via a wireless connection.

The plurality of reference noises 7 is provided by a reference noise collection 26.

Similarity values arise when comparing the noise 4 with the reference noises 7. If at least one similarity value of the comparison exceeds a minimum similarity value, the noise 4 is assigned to a most similar reference noise of the plurality of reference noises 7. The most similar reference noise is, in particular, the reference noise which has the highest similarity value as a result of the comparison. If the noise 4 is assigned to the most similar reference noise, that is to say the minimum similarity value is exceeded, a special operating state 8 of the motor vehicle 1 is detected.

The special operating state 8 differs from a normal operating state of the motor vehicle 1. The special operating state 8 is present, for example, when there is a defective wheel bearing, as in the exemplary embodiment from FIG. 1. In contrast, the normal operating state is present when the motor vehicle 1 is operated without defects or faults. The special operating state 8 is characterized, in particular, by the presence of the defective component 6.

After the noise 4 has been assigned to the most similar reference noise, the defective component 6 is then determined. The defective components 6 may be determined, in particular, by virtue of the fact that at least one defective component 6 is respectively assigned to the reference noises 7. The assignment between defective components 6 and reference noises 7 may be carried out, for example, by means of training which is carried out by the vehicle manufacturer, for example, or by the user himself. However, the assignment may also be trained by any arbitrary third party.

As a result of the mobile apparatus 3 being coupled to the motor vehicle 1, the mobile apparatus 3 may obtain information from a communication bus 9 of the motor vehicle 1. In this case, the communication bus 9 is in the form of a CAN bus, a LIN bus or Ethernet, for example. A multiplicity of sensors and information providers, in particular, are connected to the communication bus 9 of the motor vehicle 1. A state 10 of the motor vehicle 1 may be determined on the basis of the information from the communication bus 9. The state 10 may be, for example, a current speed value, a current acceleration value, a wheel speed or the activity of a component. As a result of the state 10, the information relating to whether a windshield wiper is in an active or deactivated state or whether a lighting unit is active or inactive is then also available, for example.

According to the exemplary embodiment, the noise 4 is purged of a normal noise before being compared with the reference noises 7. Only the purged noise is then compared with a plurality of reference noises 7. The normal noise is present when the motor vehicle 1 is being operated in the normal operating state.

In particular, a plurality of normal noises which are characterized by a respective state 10 of the motor vehicle 1 are present. The normal noise is recorded, for example, at different speeds of the motor vehicle 1. The normal noise is therefore preferably present in different forms, but preferably only for situations in which the motor vehicle 1 is operated without faults.

According to the exemplary embodiment, a current environmental situation 11 of the motor vehicle 1 is captured while capturing the noise 4. The current environmental situation 11 may be, for example, a road condition, that is to say a gravel road or a concrete road, rainfall, snowfall, other road users, animals, wind speed or flying objects. The current environmental situation 11 is captured, in particular, using at least one environmental sensor 12 of the motor vehicle 1. The environmental sensor 12 may be in the form of a camera, a radar sensor, an ultrasonic sensor, a lidar or a laser scanner, for example. However, the environmental situation 11 may also be captured by an environmental sensor of the mobile apparatus 3. For example, the mobile apparatus 3 may have a camera as the environmental sensor 12. The normal noise may then also be selected from a collection of normal noises on the basis of the current environmental situation 11.

However, the current environmental situation 11 may also be captured by a sensor outside the vehicle or outside the apparatus, for example by an environmental sensor of a further motor vehicle which transmits the current environmental situation 11 to the motor vehicle 1.

The exemplary embodiment also provides for a position 13 of the mobile apparatus 3 in the interior 2 relative to the motor vehicle 1 to be determined. The position 13 may be determined, for example, on the basis of a global navigation satellite system (GNSS). In this case, the mobile apparatus 3 then has a GNSS receiver, for example, and/or the motor vehicle 1 has a further GNSS receiver. However, the position 13 may also be determined on the basis of an image recording made using a camera of the mobile apparatus 3. For example, it is possible to record an image of the interior 2, as a result of which the position 13 of the mobile apparatus 3 in the interior 2 may be inferred on the basis of comparisons with geo-referenced reference images.

Provision is also made, in particular, for a distance 14 between the source 5 and the position to be determined. The distance 14 may be determined, for example, on the basis of two different positions 13 of the mobile apparatus 3. The noise 4 is captured, for example, from at least two different positions 13 in the interior 2. The distance 14 may then be determined on the basis of the orientation of the mobile apparatus 3 with respect to the source 5 and/or on the basis of the respective volume of the noise 4 which varies from one position 13 to another, for example.

Additionally or alternatively, an orientation 15 of the source 5 with respect to the mobile apparatus 3 is determined, in particular. The orientation 15 may be determined, for example, on the basis of a reference point which may be, for example, the center of the rear axle of the motor vehicle 1 or the center of the steering wheel of the motor vehicle 1.

A position 16 of the source 5 is then determined on the basis of the distance 14 and the orientation 15. The position 16 of the source 5 may also be, for example, a position region which is situated in a part of the motor vehicle 1, for example, and comprises only some components of the motor vehicle 1. The reference noises 7 are then selected by means of the position 16 of the source 5 and the noise 4 is only compared with the selected reference noises. The reference noises 7 are selected, for example, in such a manner that only reference noises which are assigned to a defective component 6 and are situated at the position 16 of the source 5 or at a particular distance from the position 16 of the source 5 are taken into account in the assignment.

Figure 2:
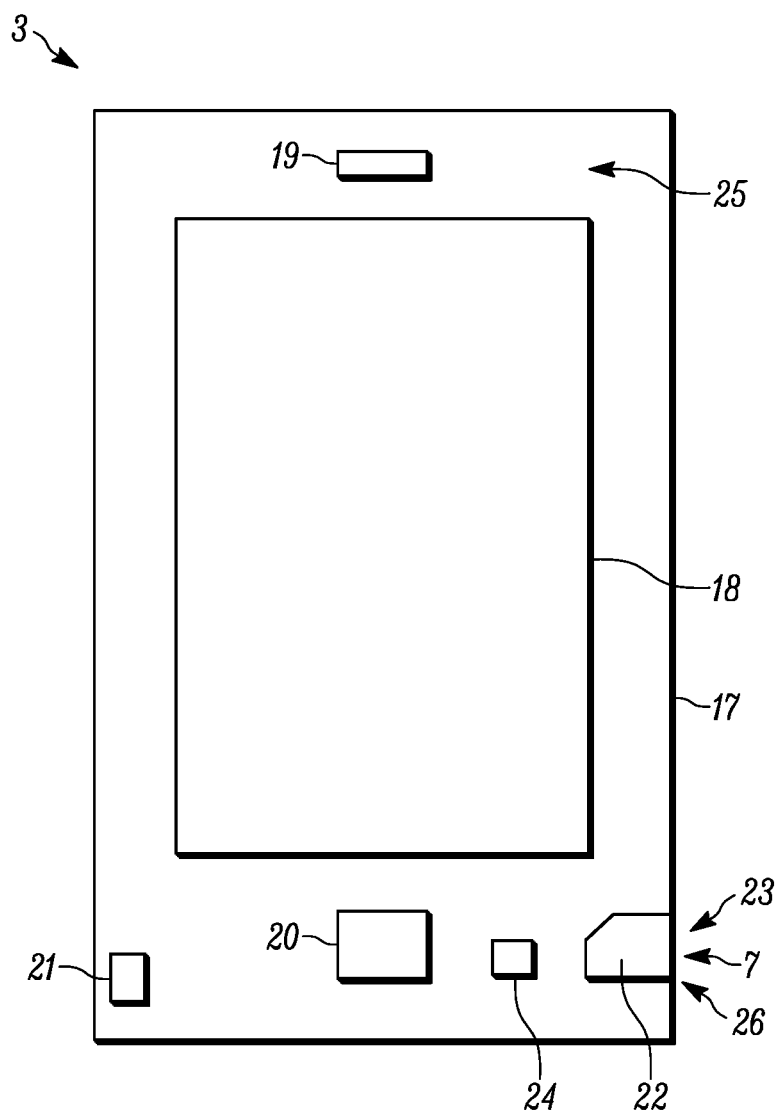
FIG. 2 shows a schematic illustration of the mobile apparatus having a microphone.

FIG. 2 shows the mobile apparatus 3. In this case, the mobile apparatus 3 is in the form of a smartphone, in particular. However, the mobile apparatus 3 may also be in the form of a laptop or a PC (personal computer) with a sound card, for example. According to the exemplary embodiment, the mobile apparatus 3 has a housing 17, a screen 18, a loudspeaker 19, an operating element 20 and a microphone 21.

According to the exemplary embodiment, the mobile apparatus 3 also has a memory 22. The memory 22 stores a computer program product 23. The computer program product 23 comprises instructions for the mobile apparatus 3 for carrying out the method for detecting the special operating state 8.

The computer program product 23 is, in particular, in the form of an application program, "app" for short.

According to the exemplary embodiment, the mobile apparatus 3 is also used to capture a current acceleration value while capturing the noise 4. The current acceleration value is captured, for example, by an acceleration sensor 24 of the mobile apparatus 3. Additionally or alternatively, however, the current acceleration value may also be captured by a GNSS receiver of the mobile apparatus 3. The noise 4 is then assigned to the most similar reference noise on the basis of the current acceleration value of the mobile apparatus 3, in particular. Reference noises 7 may in turn be selected on the basis of the current acceleration value of the mobile apparatus 3, for example. Only the selected reference noises 7 then taken into account in the comparison, for example.

Additionally or alternatively, provision is made for the mobile apparatus 3 to output a workshop proposal 25, for example via the screen 18 and/or the loudspeaker 19. The workshop proposal is made on the basis of an assignment of workshops to the respective reference noises. A reference noise is assigned, for example, a workshop which specializes in repairing that defective component 6 which is assigned to the reference noise 7. For example, it is also possible to propose a workshop which is currently right in the vicinity of the motor vehicle 1.

A sequence of the method is as follows, for example. A user of the mobile apparatus 3 and/or of the motor vehicle 1 registers image noise or the noise 4. He then possibly installs the computer program product 23 on the mobile apparatus 3 and executes it.

The mobile apparatus 3 is used to capture the noise 4. The noise 4 may be captured, for example, via the microphone 21 of the mobile apparatus 3 or, if the mobile apparatus 3 is coupled to the motor vehicle 1, via a microphone of the motor vehicle 1. The mobile apparatus 3 is operated using voice and/or gesture control, for example.

The noise 4 is then continuously recorded by the mobile apparatus 3, in particular. The noise 4 is stored, for example, in a ring memory in which older data are replaced with newer data according to a particular replacement concept. However, the noise 4 may also be directly transmitted to an external server and stored there. The measurement may contain values which are read in by the mobile apparatus 3 from the communication bus of the motor vehicle 1 via an interface. Furthermore, further measurement variables provided by the mobile apparatus 3 are concomitantly measured, in particular acceleration and/or position information and information relating to the mobile apparatus 3 in order to take into account its properties, such as the frequency response of the microphone 21, during subsequent assignment.

The user then starts the recording and the mobile apparatus 3 records the noise 4, for example, until the user ends the recording. The control with respect to the start and end of the recording of the noise 4 is carried out, for example, via a normal user interface of the mobile apparatus 3 or via voice control. Additionally or alternatively, the measurement may also be ended via an acoustic trigger, for example if a brief interfering noise which occurs only rarely is intended to be analyzed in a quiet environment. The user is then given the opportunity to listen to the noise 4 and thus check the recording.

Furthermore, the user may also enrich the recording of the noise 4 with further information, for example, in order to assist the subsequent analysis and noise classification, for example noise source, vehicle type, tire size, engine type, piston displacement. For this enrichment of the measurement with additional information, a portal provides the computer program product 23 with selection masks for noise classification which may be downloaded online via a mobile data connection or may be stored in the mobile apparatus 3.

The computer program product 23 also makes it possible for the user to mark the exact start and the end of the noise 4 in the recording. This is carried out, for example, by means of a simple push of a button during play and may be enriched by means of a graphical representation of the signal level over time. The computer program product 23 provides, for example, the opportunity to shorten the recording in order to eliminate unnecessarily long preparatory and follow-up phases. This is carried out by means of a simple push of a button during play, but may also be enriched by means of a graphical representation of the signal level over time.

The computer program product 23 provides the user with the opportunity to load the recorded post-processed noise 4 into a portal outside the vehicle. This is carried out en route by means of a mobile data connection. The portal then stores all noises 4 which have been uploaded, for example. Analysis software, for example, is used in the portal. In this case, professional providers may download the uploaded noises 4 from the portal for the purpose of their own analysis in order to provide the users with their analysis results and possibly further services.

The noise 4 may be compared with the reference noises 7 on the basis of an FFT (Fast Fourier Transform), for example. In this case, frequencies and levels are compared with one another, in particular. Different parameters, for example, are determined, for example the smallest and largest frequency or a particular number of main frequencies and the levels for the main frequencies. These values are then stored in the form of an assignment in a database or in the reference noise collection 26 having the reference noises 7.

On the basis of the parameters determined in this manner, the computer program product 23 calculates a similarity value between the noise 4 to be investigated and the reference noises 7 in the reference noise collection 26, for example using the least squares method, during the comparison. The respective parameter of the signal to be investigated is then set to 100%, and the carry of the percentage difference with respect to the relevant parameter of the comparison signal is determined and squared. These error squares are added. The comparison signal with the smallest sum of error squares is closest to the signal to be investigated. The algorithm may optionally be accelerated if the calculation for a comparison noise is aborted as soon as the current sum of error squares is already greater than the final sum in the currently most similar signal. Other methods may also be used.

In an improvement of the analysis and classification algorithms after the initial analysis of the noise, it is possible to subsequently apply the improved algorithms to the stored noises 4. Users may then be informed of new or changed analysis results. The computer program product 23 then provides the user with the most similar reference noises 7 so that the user himself may compare them with his interfering noise or the noise 4. These results are preferably presented in a table. Ideally, the first result also matches. If this is not the case, a further procedure helps. If a user scrolls through the list of results, the noises are all played in a loop, but the user then always hears that reference noise 7 above whose table entry the cursor is currently situated. If higher-quality equipment is used, this function may also be implemented by means of a knob of the mobile apparatus 3 or the operating element 20 so that the user may spin through the different reference noises 7.

The reference noise collection 26 provides a database, that is to say a central platform for interchanging reference noises 7. The reference noise collection 26 may then be forwarded to different users of further mobile apparatuses 3.

In another exemplary embodiment, the noise 4 and/or the normal noise is/are added to the reference noise collection 26 by the user independently or by a workshop. As a result, the reference noise collection 26 may be continuously expanded.

In particular, before adding the noise 4 to the reference noise collection 26, the workshop checks whether the assignment to the special operating state 8 and/or the defective component 6 is correct.

The mobile apparatus 3 and/or the reference noise collection 26 preferably has/have an interface for the workshop in order to add the noise 4 to the reference noise collection 26.

For example, the user provides the computer program product 23 with his recorded noise 4 for the comparison and the defective component 6 is output to the user after the special operating state 8 has been detected.

The noise 4 may be transmitted, together with additional information, for example the vehicle type and/or the vehicle age, to a workshop. The workshop may either carry out remote diagnosis and/or may prepare for the repair order.

The filling of the reference noise collection 26 by further users of further mobile apparatuses may be prompted, for example, by the users receiving a reward for this, for example confirmation in a social network.

The description of the invention is merely exemplary in nature and, thus, variations that do not depart from the gist of the invention are intended to be within the scope of the invention. Such variations are not to be regarded as a departure from the spirit and scope of the invention.

LIST OF REFERENCE SIGNS

1 Motor vehicle
2 Interior

3 Mobile apparatus
4 Noise
5 Source
6 Defective component
7 Plurality of reference noises
8 Special operating state
9 Communication bus
10 State of the motor vehicle
11 Environmental situation
12 Environmental sensor
13 Position of the mobile apparatus
14 Distance
15 Orientation
16 Position of the source
17 Housing
18 Screen
19 Loudspeaker
20 Operating element
21 Microphone
22 Memory
23 Computer program product
24 Acceleration sensor
25 Workshop proposal
26 Reference noise collection

What is claimed is:

1. A method for detecting a special operating state of a motor vehicle, comprising the steps of:
providing a normal operating state of the motor vehicle;
providing the special operating state which differs from the normal operating state of the motor vehicle;
providing a mobile apparatus which is separate from the motor vehicle;
providing a plurality of reference noises, which are provided by the mobile apparatus;
providing a plurality of similarity values; and
providing at least one minimum similarity value;
capturing a noise in an interior of the motor vehicle using the mobile apparatus, the noise being emitted by the motor vehicle during operation of the motor vehicle;
comparing the noise with the plurality of reference noises, and calculating the plurality of similarity values therefrom;
assigning the noise to a most similar reference noise of the plurality of reference noises on the basis of the comparison if one of the plurality of similarity values exceeds the at least one minimum similarity value;
detecting the special operating state as a result of the assignment of the noise;
determining a position of the mobile apparatus in the interior of the motor vehicle;
determining a distance between a source of the noise and the position of the mobile apparatus;
determining an orientation of the source of the noise relative to the mobile apparatus in the interior of the motor vehicle;
determining a position of the source on the basis of at least one of the distance or the orientation;
assigning the noise to the most similar reference noise of the plurality of reference noises further on the basis of the position of the source with respect to the motor vehicle.

2. The method of claim 1, further comprising the steps of:
providing at least one defective component of the motor vehicle;
producing the noise using the at least one defective component;
determining the at least one defective component by using the assignment of the noise to the most similar reference noise of the plurality of reference noises.

3. The method of claim 1, further comprising the steps of:
providing a communication bus, the mobile apparatus operable for obtaining information from the communication bus; and
providing at least one state of the motor vehicle;
determining the at least one state of the motor vehicle on the basis of the communication bus of the motor vehicle;
selecting the plurality of reference noises provided by the mobile apparatus on the basis of an assignment between the state of the motor vehicle and the plurality of reference noises.

4. The method of claim 1, further comprising the steps of:
providing a normal noise characterizing the normal operating state of the motor vehicle;
subtracting the captured noise from the normal noise; and
comparing the subtracted noise to the plurality of reference noises.

5. The method of claim 1, further comprising the steps of:
providing a current acceleration value of the mobile apparatus;
capturing the current acceleration value of the mobile apparatus while capturing the noise;
assigning the noise to the plurality of reference noises on the basis of the current acceleration value.

6. The method of claim 1, further comprising the steps of:
capturing at least one current environmental situation of the motor vehicle while capturing the noise; and
assigning the noise to the plurality of reference noises on the basis of the current environmental situation.

7. The method of claim 1, further comprising the steps of:
providing a workshop proposal for the motor vehicle;
determining the workshop proposal for the motor vehicle by using an assignment between the workshop proposal and the plurality of reference noises.

8. The method of claim 1, further comprising the steps of:
providing operating information relating to the motor vehicle;
recording the noise together with the operating information relating to the motor vehicle using the mobile apparatus such that the noise and operating information relating to the motor vehicle are used as one of the plurality of reference noises.

* * * * *